United States Patent [19]

Pray

[11] 4,258,461
[45] Mar. 31, 1981

[54] APPARATUS FOR APPLYING BELT FASTENERS TO A BELT

[75] Inventor: Winston C. Pray, Lombard, Ill.

[73] Assignee: Flexible Steel Lacing Company, Downers Grove, Ill.

[21] Appl. No.: 948,971

[22] Filed: Oct. 5, 1978

[51] Int. Cl.³ .............................................. B23P 19/00
[52] U.S. Cl. ................................. 29/243.5; 24/33 B; 29/526 A; 29/509
[58] Field of Search ...................... 29/526 A, 432, 509, 29/798, 243.5, 243.51, 243.56, 243.53, 243.52, 281.5; 269/152, 87.3; 254/52; 227/140, 141, 152, 154, 155; 24/33 B, 33 H

[56] References Cited

U.S. PATENT DOCUMENTS

| | | | |
|---|---|---|---|
| 892,959 | 7/1908 | Henderson | 254/52 |
| 3,176,358 | 4/1965 | Leflon | 24/33 B |
| 3,261,085 | 7/1966 | Hobson | 29/243.51 |
| 3,574,898 | 4/1971 | Scott | 254/52 |
| 3,742,557 | 7/1973 | Francois | 24/33 B |
| 3,913,180 | 10/1975 | Pray | 24/33 B |
| 4,111,080 | 9/1978 | Pray | 29/243.51 |

*Primary Examiner*—James L. Jones, Jr.
*Attorney, Agent, or Firm*—Fitch, Even, Tabin, Flannery & Welsh

[57] ABSTRACT

An apparatus is disclosed for riveting two elements together utilizing upper and lower plate fastener portions wherein means are provided for securing the lower plate fastener portions in an aligned relationship with an underlying anvil base. Also provided are means for securing the upper plate portions aligned with the lower plate portions and the two elements therebetween while the rivets are driven.

41 Claims, 26 Drawing Figures

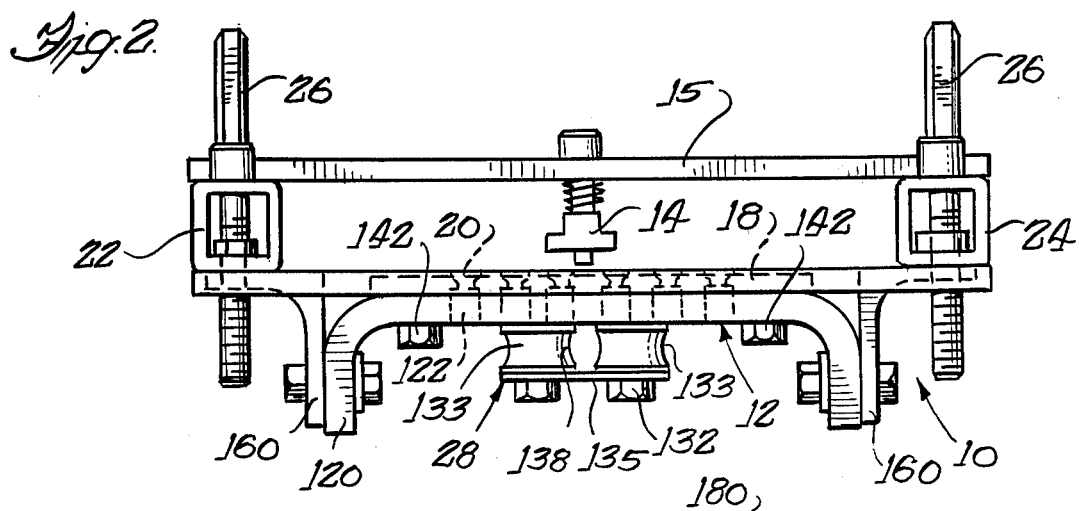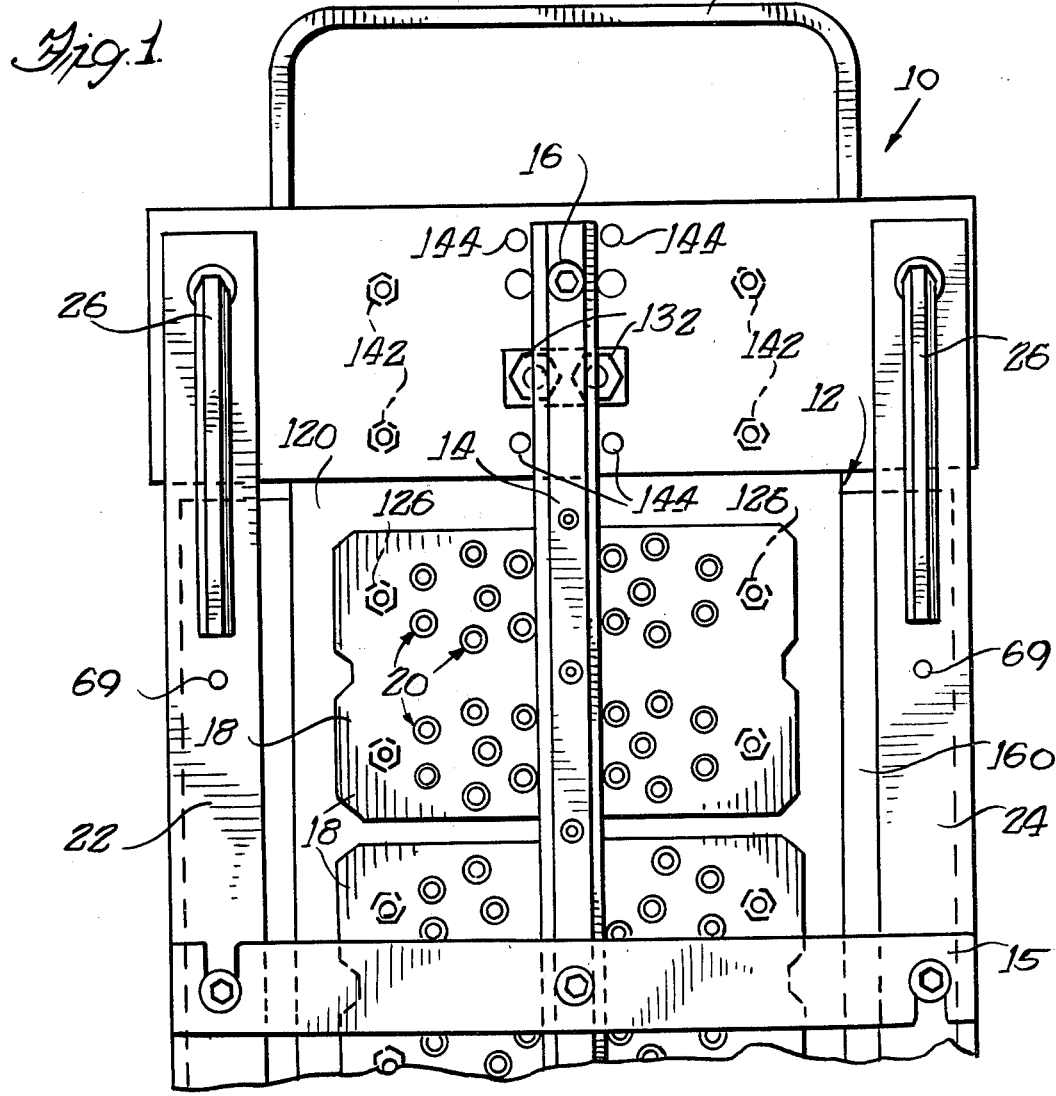

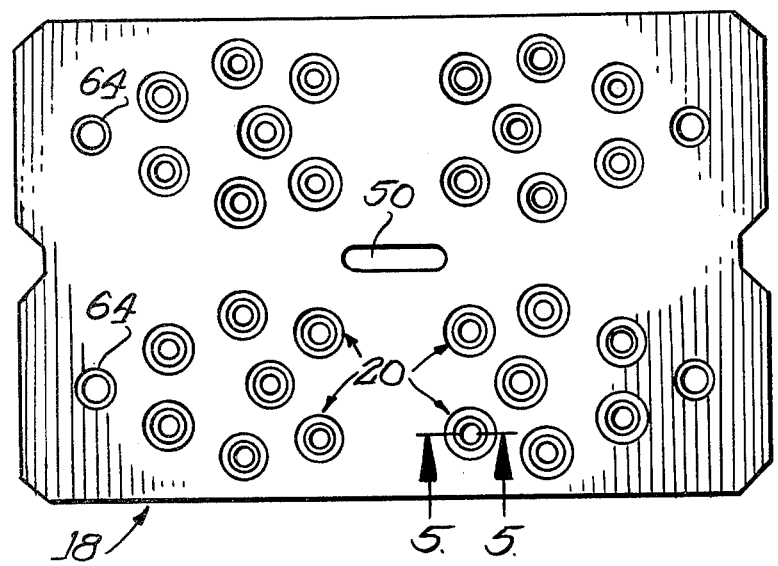
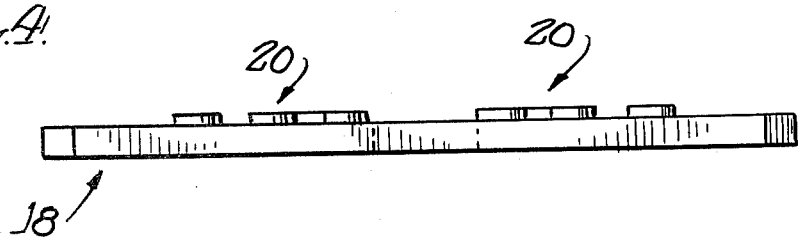
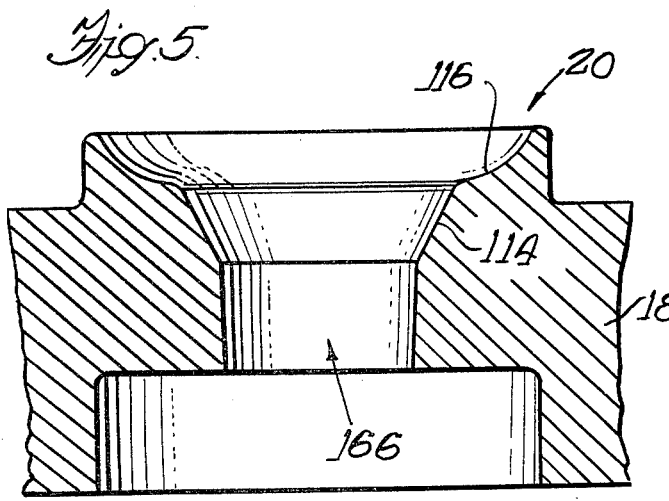
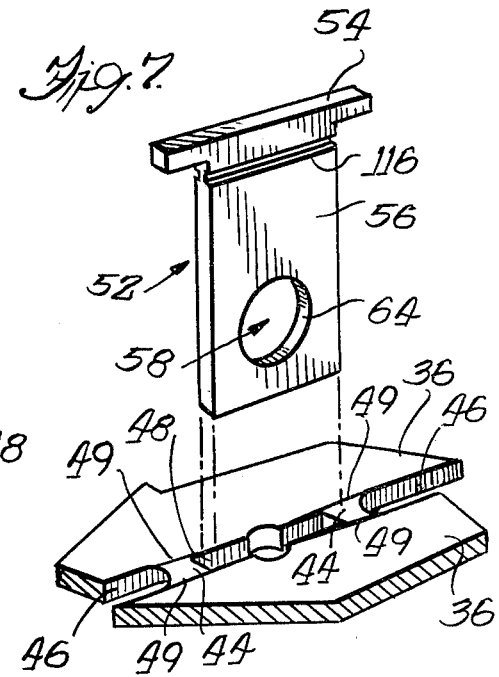

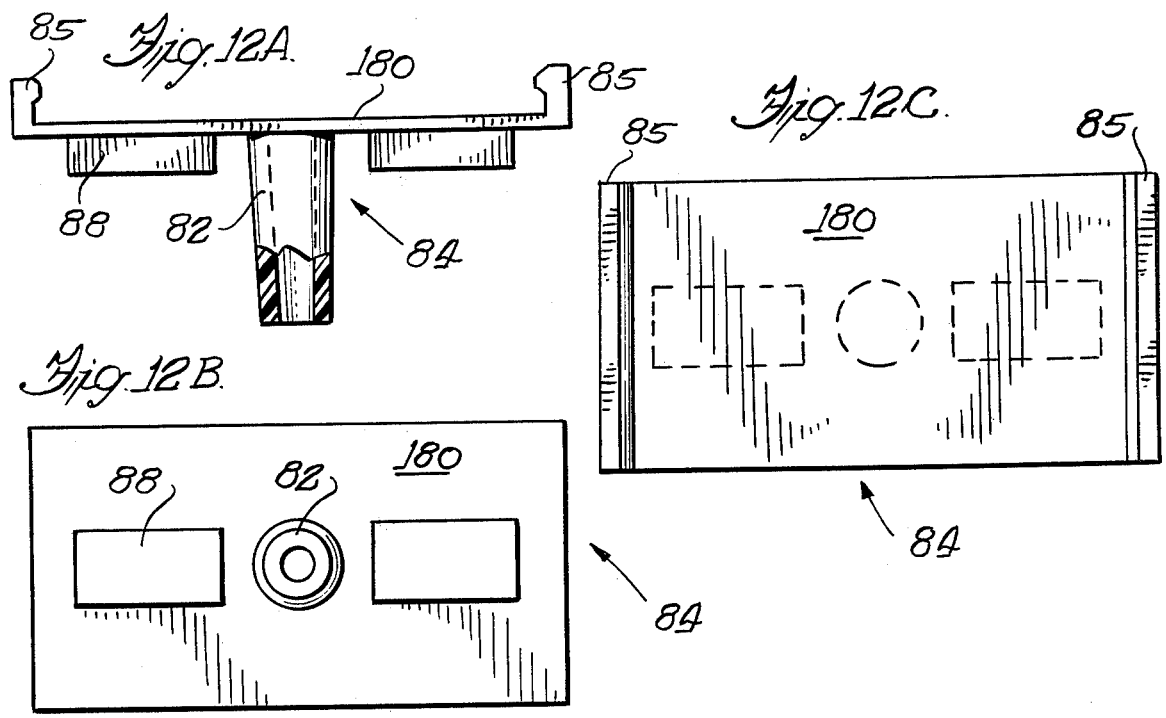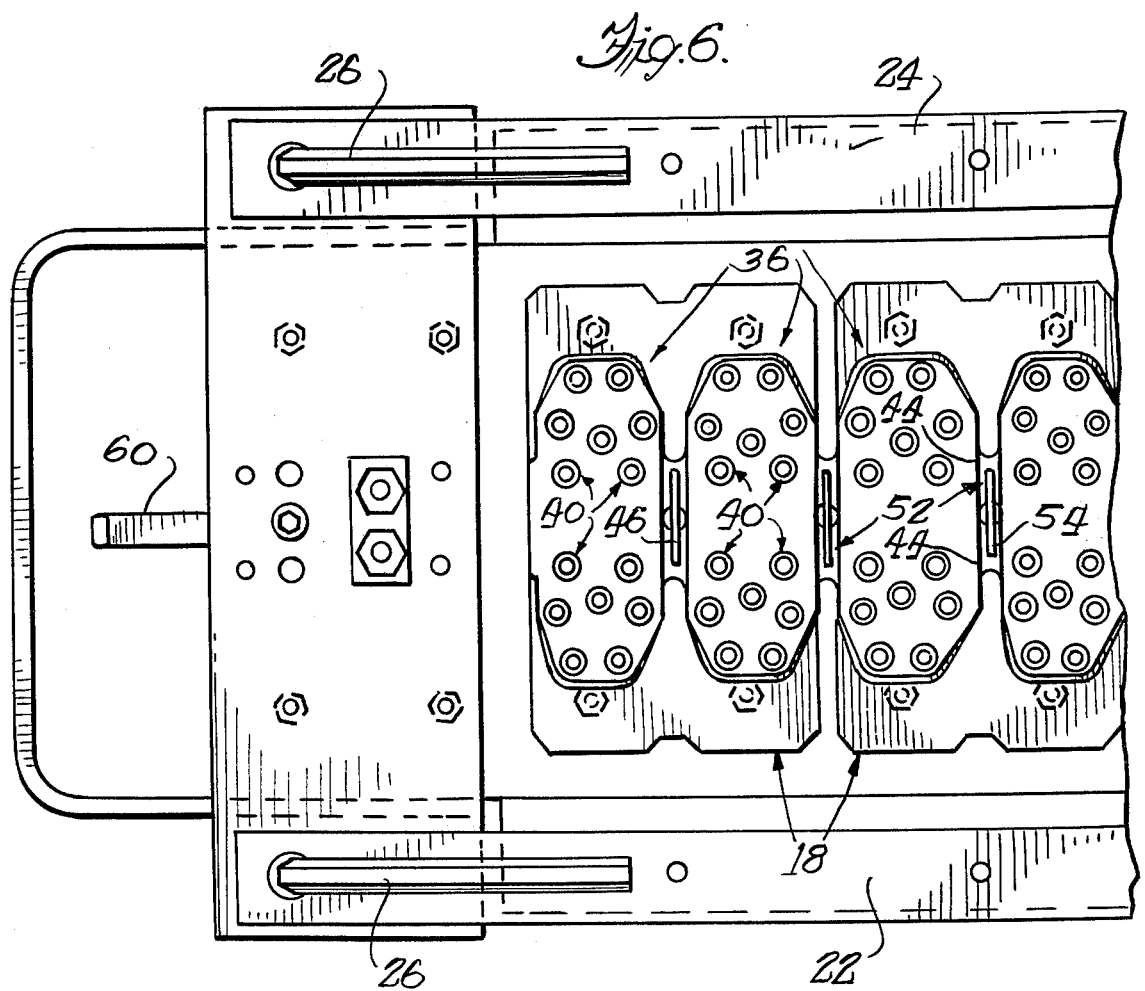

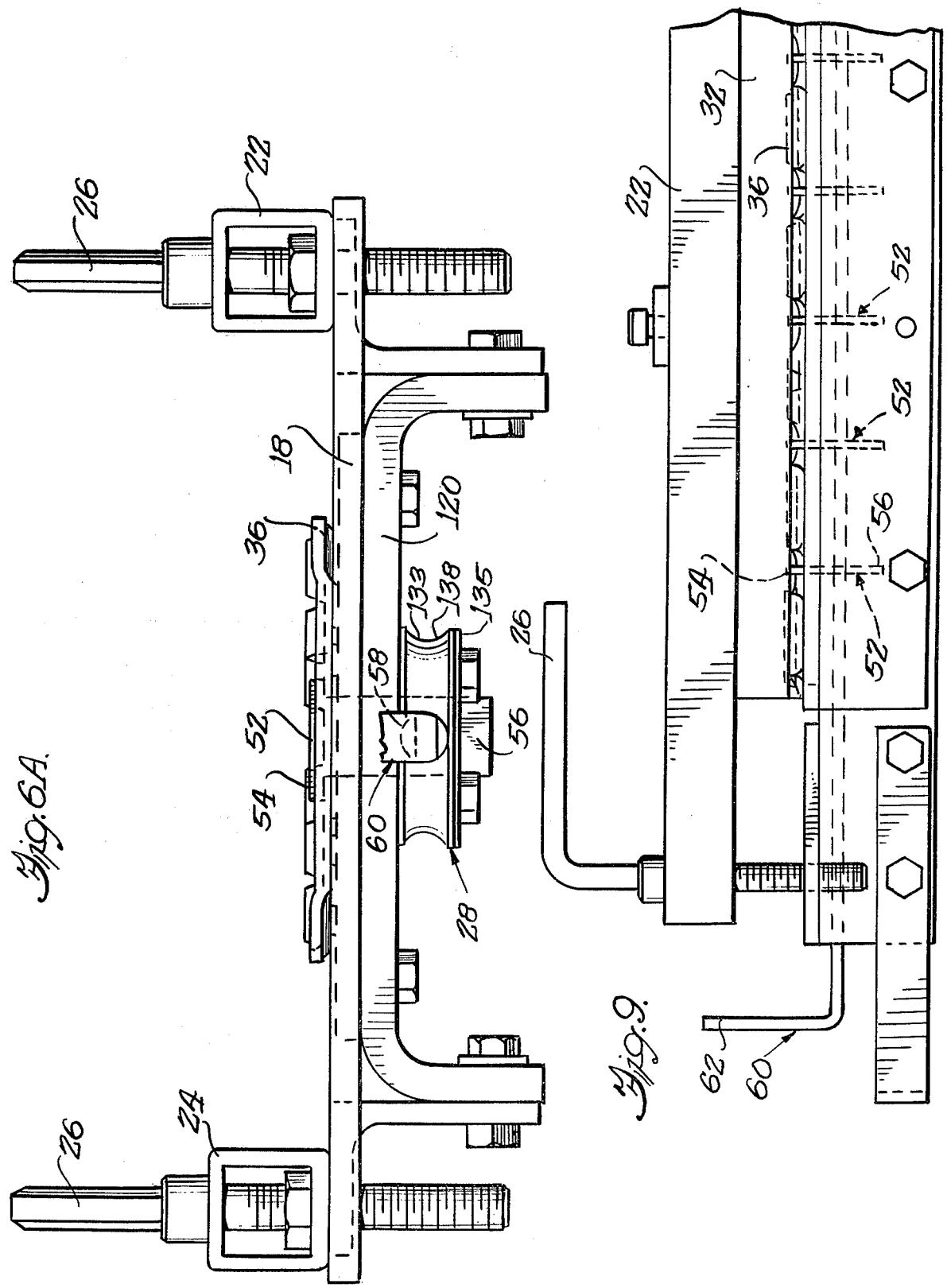

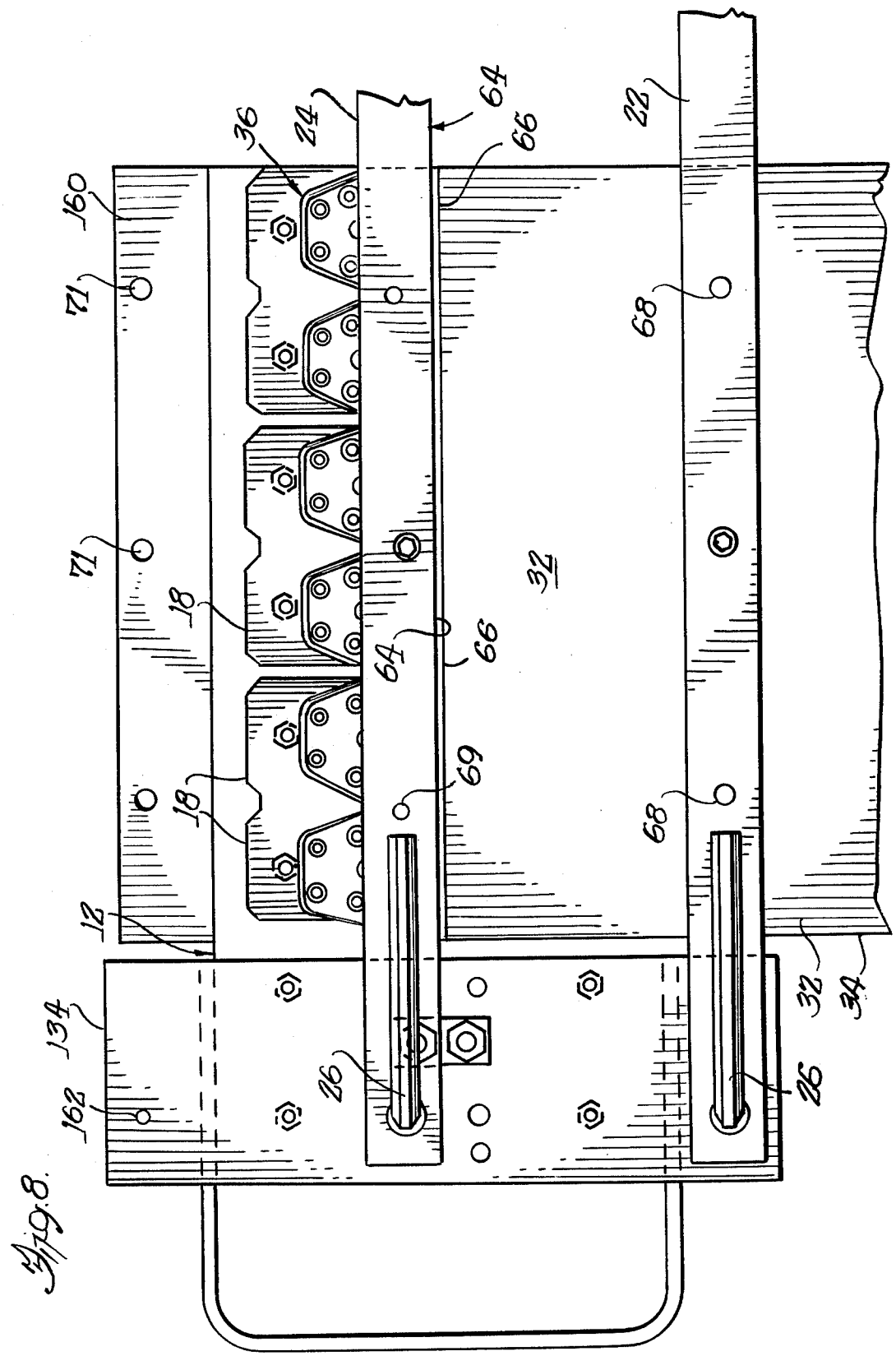

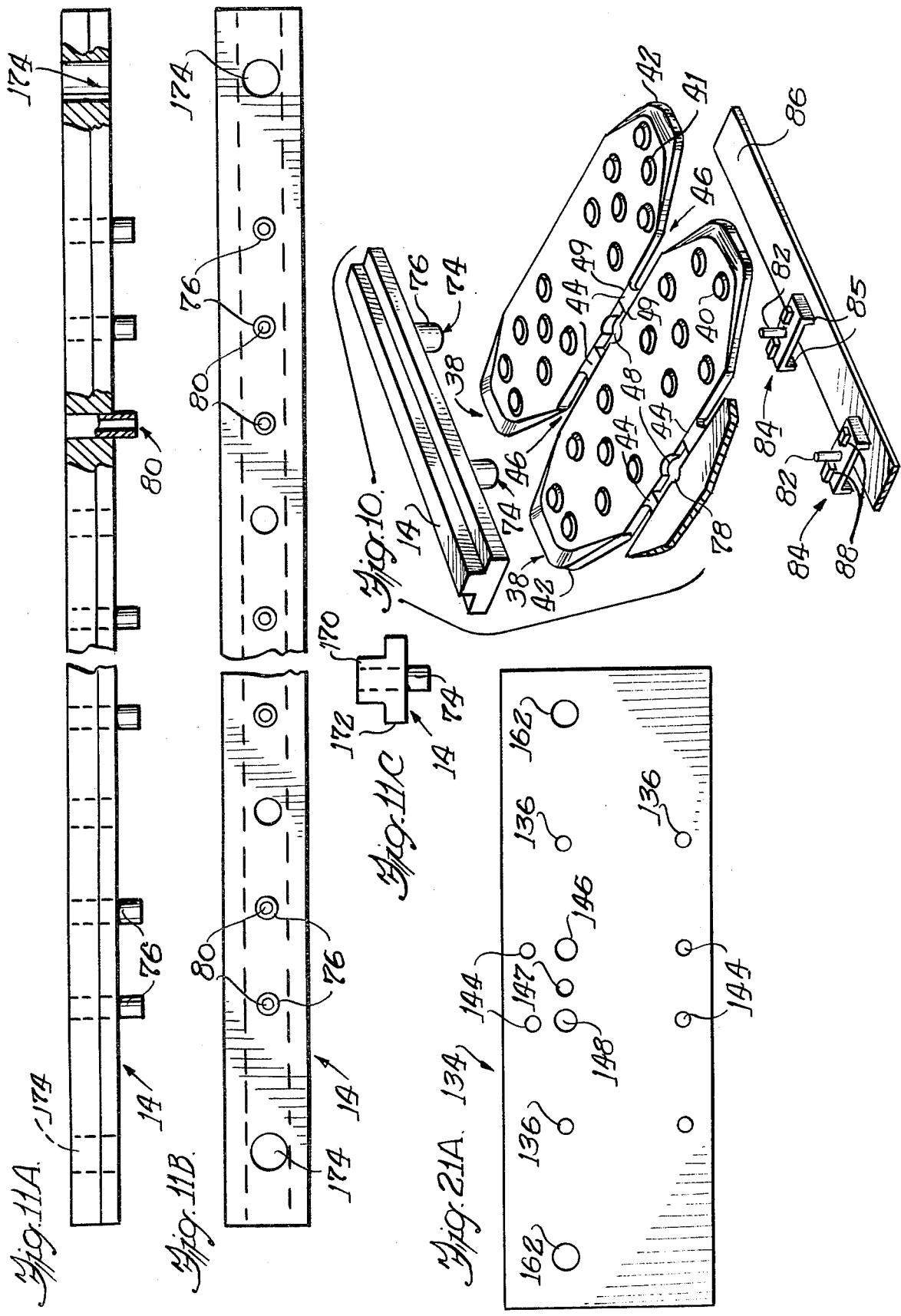

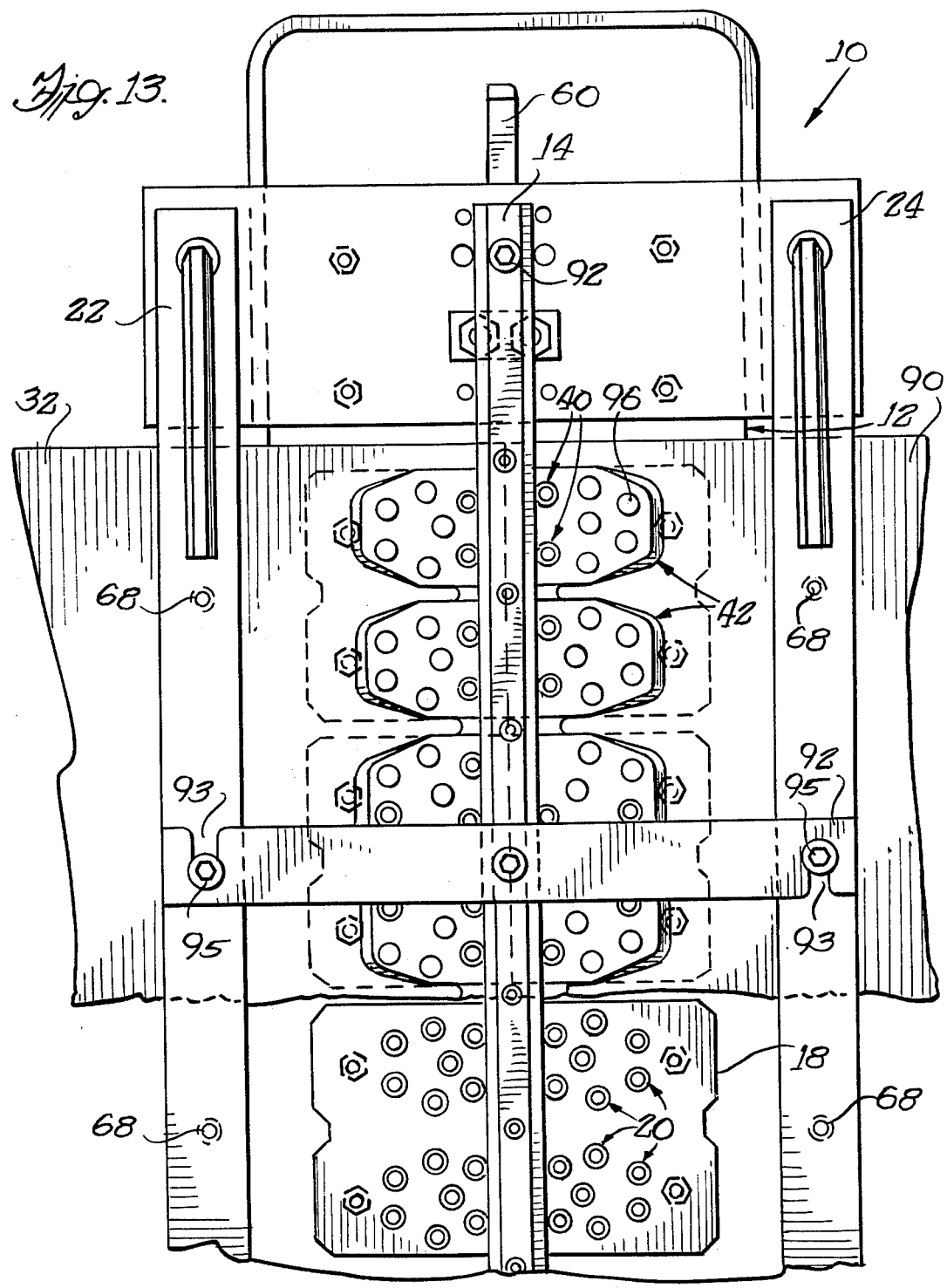

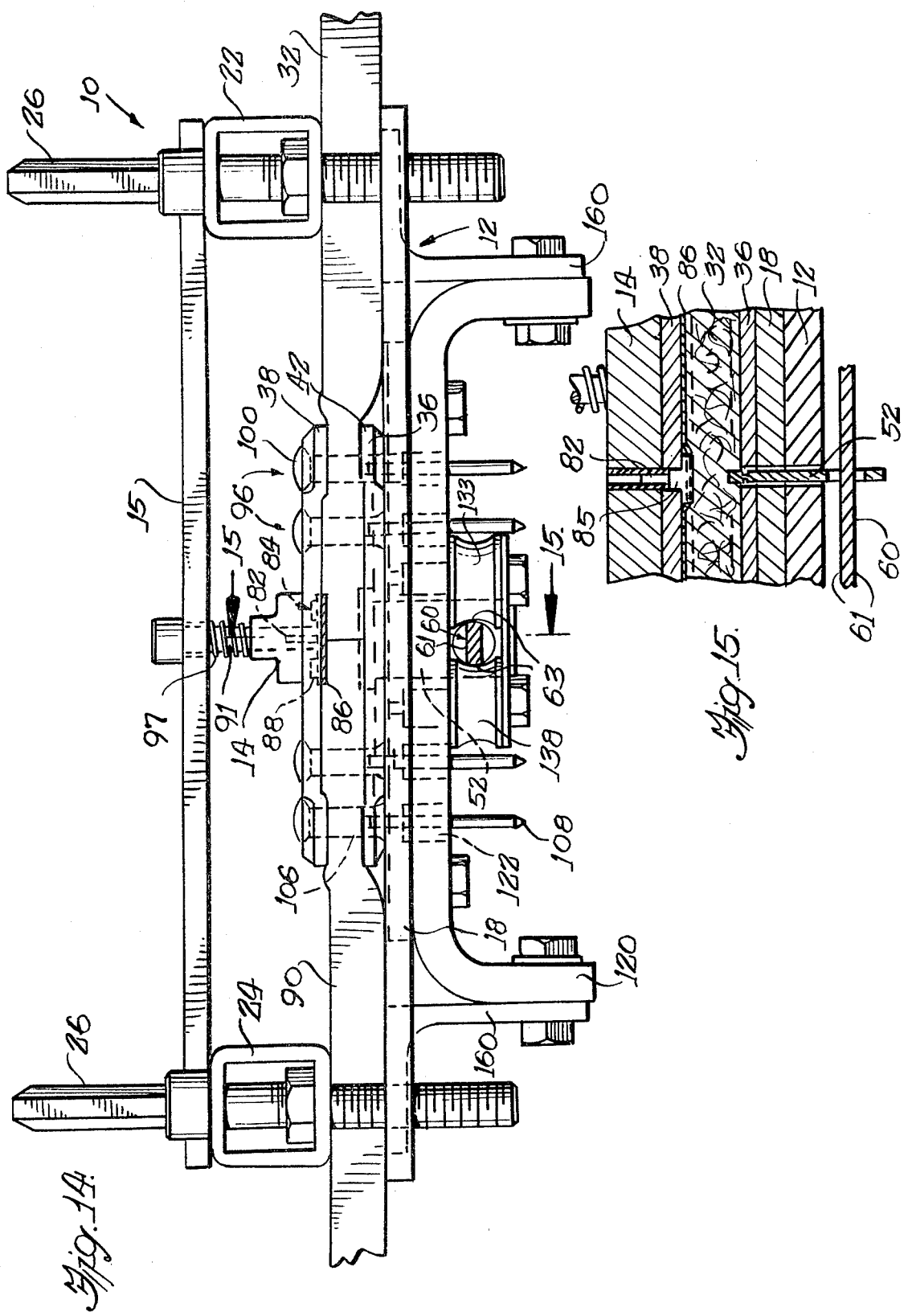

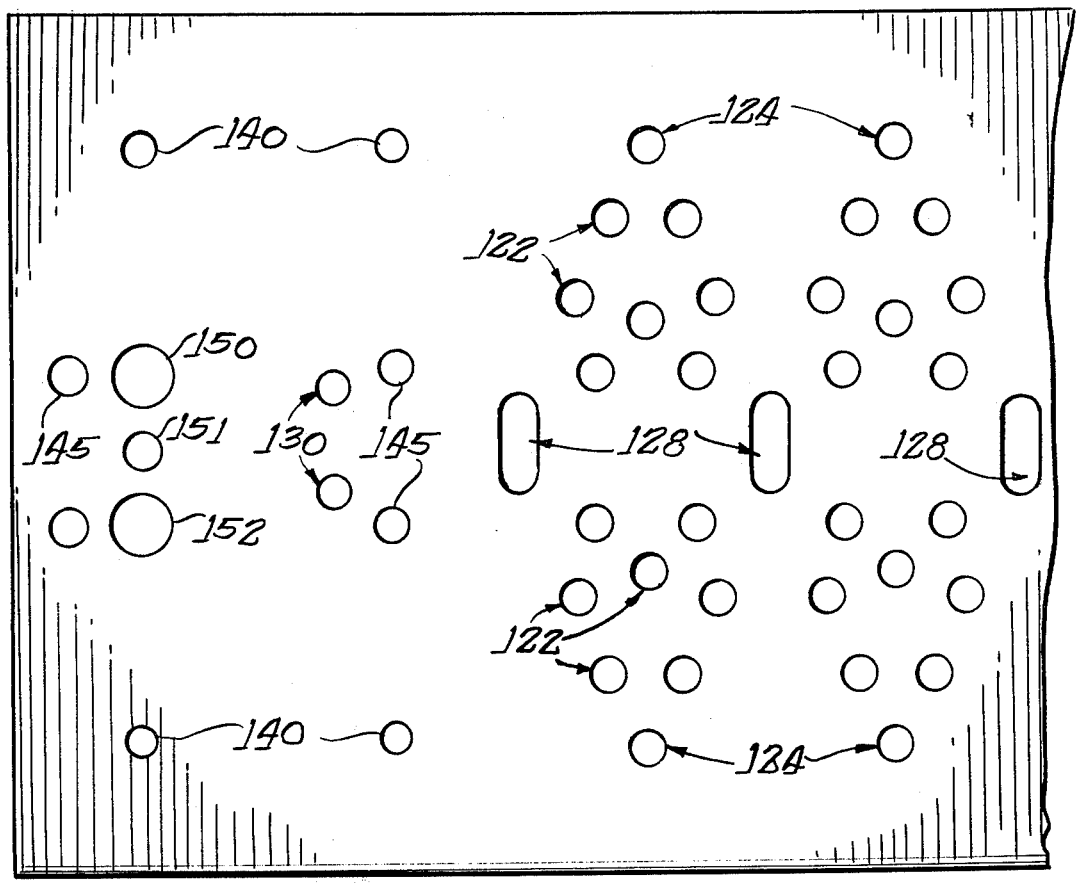
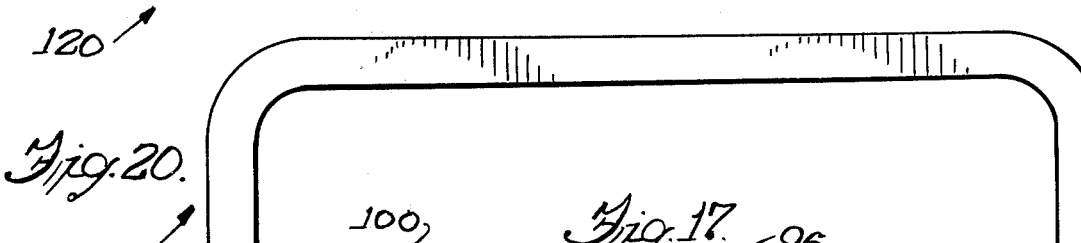
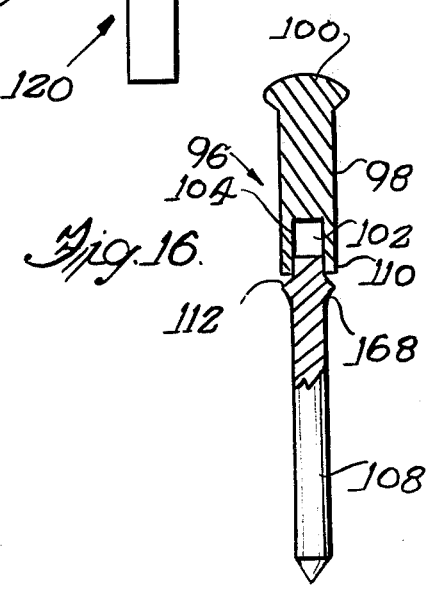
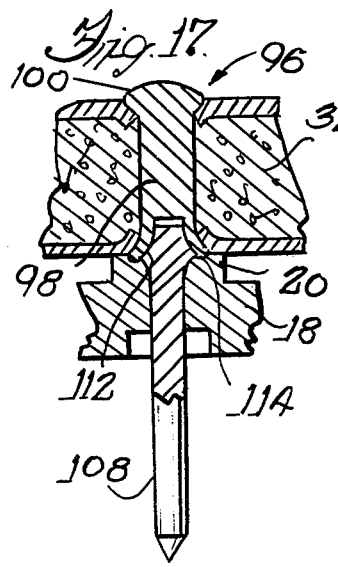
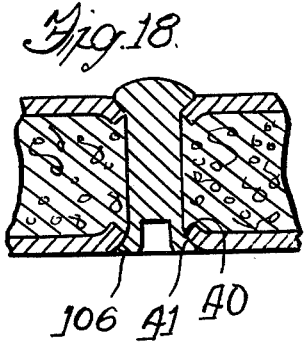

APPARATUS FOR APPLYING BELT FASTENERS TO A BELT

This invention relates to a system for securing belt fasteners to a belt by rivets and to a system of attaching belt fasteners to opposite ends of a conveyor belt.

The system disclosed herein may be used to join various and diverse belt fasteners to a belt and the present invention is not to be construed as limited to the illustrated and described embodiment of the invention wherein the belt fastener is a plate kind of fastener. A typical plate kind of belt fastener is shown in U.S. Pat. No. 3,141,346, and other belt fasteners such as hinged belt fasteners are shown in U.S. Pat. Nos. 3,742,557 and 3,176,358. In both kinds of belt fasteners, upper and lower portions thereof are secured to the top and bottom surfaces of a belt by rivets. The plate belt fasteners differ from the hinged belt fasteners in that the plates span the gap between the belt ends whereas in the hinged belt fastener, each plate is formed with a central U-shape hinged portion with adjacent hinge portions pivotably connected by a hinge pin. Usually, the plate belt fasteners are attached to each transverse end of the belt at spaced locations transversely of each other as it is desired that some of the plate fasteners may be inclined when the belt is troughed. The belt fasteners are secured tightly to and generally flush against the respective top and bottom sides of the conveyor belt by a plurality of rivets which project through the belt and are driven against the belt fasteners to maintain them in tight engagement with the belt. The rivets may have a preformed head which seats in a depression in the top plate or fastener and the opposite end of the rivet is upset or flared to form a lower rivet head, seated in a depression in the lower plate or fastener.

Often, it is not possible to turn the belt to expose the inner rivet ends; or it is difficult or impossible to reach the interior ends of the rivets. A riveting system and nail end rivet assembly therefor is disclosed in U.S. Pat. No. 3,913,180 in which it is not necessary to turn the belt to expose the inner rivet ends or to use a rivet tool. There, an anvil base is provided in which anvil nail or rivet nail assemblies each comprising a nail carrying a rivet, are driven through the openiings in the fasteners and the anvil base with the nail shanks piercing the belt and moving through the respective belt ends until stop surfaces thereon abut stop surfaces on the anvil base, whereupon further hammering on the upper rivet heads causes the lower ends of the rivet to move downwardly breaking the bonding between the rivets and the nails. The anvil surfaces on the anvil base flare the bottom ends of the rivets outwardly into engagement with the lower plate fastener surfaces which complete the deformation of the lower rivet ends to form the lower rivet heads.

This system has performed satisfactorily when hinge fasteners are being used since the U-shaped hinge portions are properly positioned and located by a gauge pin together with locating surfaces on a series of upstanding posts fastened to the anvil base so that a hinge pin may be readily aligned and slid between the hinged U-shaped openings for each opposite set of fasteners on their respective belt ends. Furthermore, the gauge pin supported by the upstanding post secures the hinge fasteners against shifting while the rivet nails are being driven into the belt and maintains the hinge fasteners aligned over the respective anvil upsetting portions. The upper and lower plate fasteners cannot become misaligned with respect to each other since they are usually of unitary construction.

However, in the embodiment illustrated for the plate belt fasteners, the string of lower plate fasteners are positioned into a pair of slots positioned at each end of the string to align the lower plate fasteners over the anvil upsetting portions. The string of upper plate fasteners is clamped at its respective ends to the anvil base so that the openings of the upper plate fasteners are aligned with the openings of the lower plate fasteners. Since the lower belt fasteners are not secured to the anvil base but rested between the slots, as the nail rivets are driven through the heavy belts, there is a tendency for the belt to raise up and bunch up even though it is secured by a belt clamp. When the belt raises up, this tends to raise the plates wherein they may become loose and misaligned with respect to each other and the anvil down below.

Furthermore, since the upper plate fasteners are clamped at the ends, if one of the strips between the individual plates should break prematurely, then those plate fasteners would no longer be useable since they could no longer be held down. Further, this necessitates, for each belt size, a special inventory of different length of strings of plate fasteners, such as 24, 28, 42, 48 and 60 inch strings, corresponding to the various widths of belts. Furthermore, 60 inch strings of plate fasteners are cumbersome to store and handle. Additionally, it has been found necessary to hold the top plate belt fasteners if they are to retain their alignment with the lower belt fasteners.

Accordingly, it is an object of the present invention to provide a new and improved system for riveting together two elements obviating for practical purposes, the above mentioned limitations.

Other objects and advantages of the invention will become apparent from the following detailed description taken in connection with the drawings in which:

FIG. 1 is a fragmentary plan view of one end of an apparatus embodying the present invention;

FIG. 2 is an end view of the apparatus of FIG. 1;

FIG. 3 is a plan view of an anvil plate of the apparatus of FIG. 1;

FIG. 4 is an end view of the anvil plate of FIG. 3;

FIG. 5 is an enlarged fragmentary, sectional view along the line 5—5 of FIG. 3, of a rivet upsetting portion of the anvil plate of FIG. 3;

FIG. 6 is a fragmentary plan view of the apparatus of FIG. 1 with the upper plate clamping bar removed and the lower plate fasteners clamped into place on top of the anvil plates;

FIG. 6A is an end view of the apparatus of FIG. 6;

FIG. 7 is a fragmentary perspective view of the assembling of the lower plate fastener clips and the lower plate fasteners;

FIG. 8 is a fragmentary plan view of the apparatus of FIG. 6 with one belt end in place aligned against a belt clamping bar;

FIG. 9 is a side view of the apparatus of FIG. 8;

FIG. 10 is a fragmentary perspective view of the assembling of the upper plate clamping bar, the upper plate fasteners, the belt end strip and the belt end clips;

FIG. 11A is a side view of the upper plate fastener clamping bar, with FIGS. 11B and 11C illustrating bottom and end views, respectively, of the upper plate fastener clamping bar;

FIG. 12A is a partially fragmentary side view of a belt end strip aligning clip, with FIGS. 12B and 12C providing bottom and top views, respectively, of the clip of FIG. 12A;

FIG. 13 is a fragmentary plan view of the apparatus shown in FIG. 8 with the other belt end, the upper plate fasteners and the belt end strip clamped into place;

FIG. 14 is an enlarged, partially cross-sectional end view of the apparatus of FIG. 13;

FIG. 15 is an enlarged, fragmentary cross-sectional view taken along the lines 15—15 of the apparatus of FIG. 14;

FIG. 16 is an enlarged, longitudinal, cross-sectional view of a rivet nail;

FIG. 17 is an enlarged, fragmentary cross-sectional view of an inner end of a rivet being flared;

FIG. 18 is a cross-sectional view of a rivet securing a portion of the belt fasteners through the belt;

FIG. 19 is a fragmentary plan view of the support base for the anvil plates of the apparatus of FIG. 1;

FIG. 20 is an end view of the support base of FIG. 19; and

FIG. 21A is a plan view of an end plate of the apparatus of FIG. 1.

An apparatus in accordance with the present invention for fastening two belt ends of a conveyor belt together utilizing upper plate fasteners and lower plate fasteners is indicated generally at 10 in FIGS. 1 and 2. The apparatus is shown to comprise an anvil base 12, an upper plate fastener clamping bar of T-rail 14 which is mounted at one end of the anvil base 12 with a bolt 16 and is also bolted to the other end (not shown) of the apparatus in a similar manner. A T-rail locator plate 15 further secures the T-rail to the anvil base. Bolted to the anvil base 12 are a plurality of anvil plates 18 (shown in greater detail in FIGS. 3 and 4), each of which has a plurality of rivet end upsetting portions or buttons 20, shown in greater detail in FIG. 5, and which are positioned to correspond with the rivet receiving holes of the upper plate and lower plate fasteners (not shown). There may be twenty or more anvil plates 18 bolted to the device depending upon the maximum size of belt desired to be accommodated, but only a few of the anvil plates are shown for clarity.

The apparatus further comprises belt end clamping bars 22 and 24 for clamping belt ends 32 (FIG. 8) to the anvil base 12. The belt clamping bars 22 and 24 are bolted at opposite ends of the anvil base 12 by handle bolts 26. Bolted to the bottom of each end of the apparatus 10 is a cam guide 28, as best seen in FIGS. 6A and 9, through which a cam lock rod 60 may be inserted to lock the lower plate fasteners properly in position.

The apparatus 10 briefly described above may be utilized in the following manner to fasten two belt ends together using upper plate fasteners, lower plate fasteners and rivet nails. First, the T-rail locator plate 15, the clamping T-rail 14 and the belt clamping bars 22 and 24 are unbolted and removed from the anvil base 12. Then, in order to determine the desired number of upper plate and lower plate fasteners, a belt end 32 such as that shown in FIG. 8 is laid across the top of the anvil base 12 partially covering the anvil plates 18 with the leftmost edge 34 of the belt end overlapping the leftmost anvil plate 18. The proper number of fastener plates may be readily determined by counting the number of anvil plates partially covered since there are two fastener plates corresponding to each anvil plate.

After the proper count has been determined, the belt end 32 is removed and lower plate fasteners 36 are laid out over the anvil plates 18, as shown in FIG. 6. The lower plate fasteners 36 are similar to upper plate fasteners 38, shown in FIG. 10. Each fastener plate has a plurality of rivet receiving holes 40 which are spaced to correspond with the buttons 20 of the anvil plates 18 and have a depression 41 to seat a rivet end. The ends 42 of the upper plate fasteners 38 are turned downwardly to bite into the belt, as shown in FIG. 14, whereas the ends of the lower plate fasteners 36 are turned upwards to bite into the belt 32.

As best seen in FIG. 7, the plate fasteners in a string of plate fasteners are joined to an adjacent plate fastener by two bridging members 44 each of which are bordered by two channels 46. A central slot 48 with a central aperture is disposed between the bridging members. Lines of weakness 49 allow the bridging members to break away. That is, bridging members 44 and channels 46 allow the individual plate fasteners to be broken apart after the belt ends have been fastened together so as to allow the conveyor belt to trough while in use.

When the lower plate fasteners are laid out over the anvil plates 18, the slots 48 of the plate fasteners are aligned with slots 50 (FIG. 3) of the anvil plates 18 so that the holes 40 of the lower plate fasteners are properly aligned and positioned with respect to the buttons 20 of the anvil plates 18 (FIG. 6) therebelow.

As best seen in FIG. 7, T-shaped lower plate fastener clips or retainers 52 having a cross member 54 and a frangible central member 56 which defines an aperture 58, may be inserted into the slots 48 of the lower plate fasteners 36 and the slots 50 of the anvil plates 18 so that the cross member 54 of each clip 52 engages and hooks the bridging members 44 on the upper side of the lower plate fasteners 36 (FIG. 6) and central or bottom member extends below the anvil base 12 (FIG. 6A). A camming lock rod 60 may be inserted into the cam guide 28 (FIG. 6A) and also inserted through each of the apertures 58 of the T-clips 52 (as best seen in FIG. 9 which illustrates a later step). The cam lock rod 60 is a flat rod having opposite flat sides 61 (FIGS. 14 and 15) which are horizontal when the rod 60 is inserted through the clip apertures 58. The handle 62 of the lock rod 60 may then be rotated through 90° so as to rotate rod ends 63 against inner surface 64 of the apertures 58 of each T-clip 52 so as to cam down and lock the T-clips 52 in place as the flat sides 61 of the rod become vertical. The clips thus lock the lower plate fasteners 36 with the holes 40 of the lower plate fasteners properly aligned over the anvil buttons 20.

The string of lower plate fasteners need not be continuous but can be broken up into convenient lengths since a single T-clip can hold and secure two lower plate fasteners. A string of seven plate fasteners has been found to be a convenient length in which six T-clips are used to hold down the string. Thus, multiples of seven can be utilized to fasten the edges of the belt ends together. No inventories of plate fastener strings of lengths corresponding to the widths of belt ends to be fastened need be maintained. Further, should a string of plate fasteners break prematurely, the resulting smaller strings can be used just as easily.

Once the lower plate fasteners 36 are locked into place, the belt clampiing bar 24 may be bolted back to the anvil base 12 in a new position such that an edge 64 of the belt clamping bar 24 is located over the center of the lower plate fasteners 36 and can act as a guide surface to align the edge 66 of the belt end 32 over the center of the lower plate fasteners 36, as shown in FIG. 8. With the edge 66 of the belt end 32 registered against the edge 64 of the clamping bar 24, the belt clamping bar 22 may be rebolted to the anvil base 12 with the handle bolt 26 to clamp and secure the belt end in position, as shown in FIGS. 8 and 9. The belt end 32 may be further secured to the anvil base 12 by driving nails 68 through apertures in the belt clamping bar 22 (similar to those indicated at 69 in the clamping bar 24) to pierce the belt ends and pass through apertures 71 (not shown) in the anvil base located below the clamping bar 22 apertures.

With the belt end 32 properly positioned, the belt clamping bar 24 may be removed and the other belt end placed over the lower plate fasteners 36 and aligned to abut with the edge 66 of the belt end 32. The other belt end may then be clamped into position with the belt clamping bar 24 and nailed in a manner similar to that described for the belt end 32 through the apertures 69 and 71.

The belt ends are now ready for the upper plate fasteners 38. As seen in FIG. 10, a portion of the upper plate fastener clamping bar or T-rail 14 is shown to have projections 74 which define cooperating locating surfaces 76, and is assembled with the strings of upper plate fasteners 38 so that the locating surfaces 76 engage enlarged openings 78 of the slots 48 of the upper plate fasteners 38. The locating surfaces of the T-rail 14 provide a register means by which the upper plate fasteners 38 may be aligned.

Each projection 76 has a bore 80 (as seen in FIGS. 11A and 11B) each of which receives a projection 82 of a strip clip 84. The strip clips 84 have a pair of downwardly extending side walls 85 which clip to and secure a strip or ribbon 86 which is to be placed over the interface 90 (FIG. 13) of the belt ends to reduce sifting of the conveyed material through the crack defined at the belt ends interface. When the projections 82 of the clips 84 are inserted into the bores 80 of the T-rail 14, locating projections 88 of the clips 84 engage the slots 48 of the upper plate fasteners 38 and position and clamp the plate fasteners 48 in precise positions on the T-rail 14 and hold the plate fasteners in these precise positions during later operations. During assembly, the T-rail with the plate fasteners and strip thereon are inverted from the positions shown in FIG. 10.

When assembled, the upper fastener plate clamping T-rail 14, the upper plate fasteners 38, the strip clips 84 and the strip 86 are then turned over to the position of FIG. 10 and are centered over the edges 66 of the belt ends 32 and their interface 90, as seen in FIG. 13. The T-rail clamping bar 14 is bolted to the anvil base 12 by the bolt 16 at one end at the center of the anvil base 12 with the other end of the T-rail bar 14 similarly bolted to the other end of the apparatus 10, not shown. One or more locator plates 15 are then bolted to the belt clamping bars 22 and 24 and to the T-rail 14 to further clamp and secure the T-rail 14 to prevent the T-rail from shifting or flexing. With the T-rail 14 so bolted, the upper plate fasteners 38 are positioned so that the rivet receiving holes 40 of the upper plate fasteners 38 are aligned with the holes 40 of the lower plate fasteners 36 (not shown) and the buttons or anvil upsetting portions 20 of the anvil plates 18 (shown in phantom and also with the upper and lower plate fasteners and belt ends broken away).

The upper plate fastening bars 14 may be as long as 60 inches or greater and hence is subject to being deflected to the extent that the rivet receiving apertures 40 in the upper plate fasteners are not aligned with the rivet receiving apertures in the lower plate fasteners. To reduce any such deflection, locator bars 15 are mounted on the bar 14 at longitudinally spaced intervals and are releasably attached to the belt clamping bars. As best seen in FIGS. 13 and 14, each locator plate 15 is pivotally mounted on an upstanding post 91 for turning in a horizontal plane to bring slots 93 at opposite ends into receiving relationship with upstanding pins 95 fastened to the upper sides of the respective belt clamp bars 22 and 24. A coiled spring 97 encircling the post 91 biases the locating plate 15 upwardly. The width of each slot 93 is such that it just receives the shank of the pin 95 and hence will center the T-bar 14 and its post 91 over the interface. The locator plates are quickly swung into or from a locating relationship with the pins 95 on the respective belt clamping bars.

It should be noted here also, that the upper plate fasteners need not be one continuous string but can comprise several small strings of convenient size. The projections 76 of the T-rail 14 engage each upper plate fastener so that convenient length strings may be employed.

The belt ends and the upper and lower plate fasteners are now secured with respect to each other and the anvil base 12 so that a rivet-nail such as that indicated at 96 in FIG. 16 may be driven through the holes 40 of the upper and lower plate fasteners 36 and 38, the belt ends 32, and the apertures in the buttons 20 of the anvil plates 18, as shown in FIG. 14.

As the rivet nails 96 are being driven, the T-clips 52 (shown in phantom), locked into place by the camming lock rod 60 (shown in cross section), secure the lower plate fasteners 36 to the anvil plates 18 and the anvil base 12. The forces generated by the hammering of the rivet-nails to drive them through the belt and to flare the lower rivet ends and to seat the flared rivet ends in the belt fasteners compresses the elastomeric belt material very substantially and this compressed area exerts large lateral sidewise forces on the adjacent belt fasteners trying to push them from alignment with their associated anvil buttons 20 and upper plate fasteners. To resist such forces, the T-clips 52 are made of steel and are relatively thick. Furthermore, the T-clips 52 clamp downwardly the plate fasteners to the underlying anvil base to properly maintain the fastener plates positioned over the anvil plates 18. Furthermore, the clamping bar or T-rail 14 which is secured by the bolts 16 (not shown) and the locating plates 15, prevent the upper plate fasteners from shifting and becoming misaligned while the rivet-nails 96 are being driven. The T-rail 14 further holds the strip clips 84 and the belt ends strip 86 in place over the edges of the belt ends.

Each rivet-nail 96 is shown in FIG. 16 to comprise a rivet 98 which has a generally rounded upper head 100 at one end with a cylindrical bore 102 extending axially from the other end of the rivet and defining a thin lower cylindrical wall 104 which may be upset or deformed to form a rivet head 106, shown in FIG. 18. The rivet-nail 96 further comprises a nail 108 which is crimped or otherwise secured to the inner surface of the wall 104 of the rivet 98 to hold them together for initial handling and for driving into the belt. The rivet ends 110 are deformed by an anvil surface 112 on the nails 108 to upset and deform the lower ends 110 of the rivets 98 after the nails have traveled through the belt and into the anvil upsetting portion or buttons 20 of the anvil plates 18. Thus, a continued application of force to the upper heads 100 of the rivets 98 as with a hammer, drives the nails 108 into a stop surface 114 of the button 20 (seen in greater detail in FIG. 5) which arrests the nails, so that further downward movement of the rivets under additional hammering causes the lower ends of the rivets to flare and deform along the anvil surfaces 112 of the nails 108.

After the lower rivet ends 110 are initially flared by the anvil nail surfaces 112, they are finally seated and formed by anvil surfaces 116 of the buttons 20 (best seen in FIG. 5) which deflect the rivet ends more generally upward into positions and into the depressions 41 in the lower surface of the holes 40 of the lower plate fasteners 36, shown in FIG. 18. The rivet material is rolled and peened which compresses the belt between the upper and lower fastener plates to assure that the fasteners are disposed tightly against the upper and lower sides of the belt, as shown in FIG. 14. That is, the continuing hammering of the rivet on its upper head 100 presses the belt and causes the rivet to be moved downwardly and causes the upper plate 38 to be forced tightly against the upper belt surface as the lower plate 36 is being simultaneously forced. This tightens the engagement of the lower fastener plate with the lower surface of the belt and the rivet head 106 is being driven and rolled into tight engaging relationship with the lower fastener plate.

The rivet-nails 96 may be driven into each of the exposed holes 40 of the upper plate fasteners. The T-rail 14 and locator plate 15 may now be removed and the remaining rivet nails driven into the holes 40 which may have been somewhat obstructed by the T-rail 14 and locator bar 15. The upper and lower fastener plates will not shift out of position relative to the anvil plates therebelow despite the removal of these clamps since the previous rivet-nails driven will hold the upper and lower fastener plates together and the clamping bars 22 and 24 will hold the belt ends and fastener plates positioned properly with respect to the anvil plates 18. With all the rivet-nails 96 driven, the nails 68 may be removed from the belts and the belt clamping bars 22 and 24 may also be removed.

When the T-rail 14 is removed, the projections 82 of the strip clips 84 will protrude from the slots 40 of the upper plat fasteners 38. These projections are made of frangible material such as plastic and may be broken off. Similarly, when the belt ends 32 are removed from the anvil base 12, the central members 56 of the T-clips 52 will protrude from the slots 40 of the lower plate fasteners 36. The central member 56 of each T-clip 52 has a pair of channels 116 between the cross member 54 and the central member 56, which allows the central members 56 of the T-clips to be fractured or broken off at the channels with a hammer.

Turning now to a more detailed description of certain components of the illustrated embodiment, the anvil base 12 comprises a channel base 120, one end of which is shown in FIGS. 19 and 20. The other end is the same as that shown. The actual length of the channel base depends on the maximum belt size desired to be accommodated. The channel base 120 has a plurality of holes 122 which are spaced to correspond with the buttons 20 of the anvil plates 18 (as shown in FIG. 2). Further provided are additional holes 124 through which the anvil plates 18 may be bolted to the chanel base 120 by a set of bolts 126 (as shown in FIG. 1). The holes 122 permit the nail portion 108 of the rivet-nails 96 to pass through the channel base 120 as the rivet-nails are driven into the apparatus to fasten the belt ends, as shown in FIG. 14.

The channel base 120 also has a plurality of slots 128 which are spaced to correspond with the slots 50 (FIG. 3) of the anvil plates 18 when bolted to the channel base 120 and also spaced between the anvil plates 18. The slots 128 allow the central member 56 of the T-clips 52 to extend below the channel base 120 when the T-clips are inserted into the lower plate fastener slots 48 and the anvil plate slots 50, as shown in FIGS. 6 and 6A. A pair of cam guides 28 are secured to each end of the channel base 120. Also, at each end of the channel base are formed four holes 130 each of which receives a nut and bolt assembly 132 to secure thereto a roller shaped member 133 of a cam guide 28. A pair of the rollers 133 having concave peripheral surfaces 138 are mounted for turning on the bolts and are spaced laterally from each other with their surfaces 138 being engaged by the lock rod 60 to guide the lock rod as it is being inserted through the openings in the T-clips. Since there are two spaced pairs of rollers 133 at each end of the channel base, the cam rod 60 will be maintained in a straight line path as it travels through the openings in the T-clips 52. A bottom plate 135 spans the rollers 133 and is secured by the nut and bolt assemblies 132. When the cam rod 60 is positioned as shown in FIG. 14 with its flat sides 61 horizontal the T-clips are centered and when the cam rod 60 is rotated the top one of the sides 63 is brought into engagement with the underside of the channel base 120. Continued rotation of the cam rod 60 causes the lower side 63 to exert a downward force on the lower quadrant of the wall 64 defining the hole 58 in the T-clip 52. When the flat sides 61 of the cam rod 60 are vertical, then the top end of the rod abuts the underside of the channel base 120 and bottom end 63 of the rod abuts the bottom sidewalls 64 of the clip holes 58 thereby providing a rigid bar holding each of the clips down against very substantial forces that will be encountered by the belt portions being compressed during the rivet flaring and seating operations. Indeed, the vertical tensile forces have sometimes actually bent the steel cross arms 54 on some of the T-clips 52.

The anvil base 12 further comprises an end plate 134 for each end of the anvil base, as shown in FIG. 21A. Generally speaking, the channel base 120 has clearance holes therein while aligned holes in the end plate are tapped for threaded engagement by one of the various locking bolts. More specifically, the end plate 134 has four tapped holes 136 corresponding to four holes 140 (see FIG. 19) of the channel base 120 by which the end plate 134 may be bolted to the channel base 120 by bolts 142, as shown in FIG. 1. The end plate 134 has four tapped holes 144 (FIG. 21A) by which assembled cam guides 28 can be bolted to the end plate through aligned clearance holes 145 (FIG. 19) in the anvil base 120. The end plate 134 further has holes 146, 147 and 148 which correspond to holes 150, 151 and 152 in the channel base 120 (FIG. 19). The belt clamping bar 24 is secured by the handle bolt 26 to the plate 134 by threading the same into tapped hole 146 with the lower end of the bolt projecting through clearance hole 150 in the channel base. The tapped holes 148 and clearance hole 152 allow the belt clamping bar 22 to be bolted to the anvil base to provide an alignment guide for the belt end 32 should it be desired that the belt end 32 be clamped into position first instead of opposite belt end 32. The holes 146 and 150 are positioned such that when the belt clamping bar 24 is bolted through these holes, the edge 66 of the belt end 32 is aligned directly over the center of the lower plate fasteners 36.

The T-rail 14 is secured to the anvil base 12 by the threaded hand bolts 92 threaded at their lower ends for screwing into tapped holes 147 in the end plates 134 (FIG. 21A) with their lower ends extending through clearance holes 151 of the channel base 120 (FIG. 19). The holes 147 and 151 are located on a center line through the anvil plate 18 so that the upper plate fasteners clamped to the T-rail are centered over the edges of the belt ends with the holes 40 of the upper plate fasteners 38 aligned with the holes 40 of the lower plate fasteners 36 and the buttons 20 of the anvil plates 18.

The anvil base 12 further comprises a pair of clamp bases 160 (FIG. 2) each having a right angle cross section with one leg each bolted to opposite sides of the channel base 120. The clamp bases 160 provide a support against which the belt ends 32 may be clamped by the belt clamping bars 22 and 24, respectively, as shown in FIG. 14.

The belt clamping bars 22 and 24 each comprise a hollow tube having a rectangular cross section as shown in FIG. 2. These bars clamp the belt ends to the anvil base 12, as shown in FIG. 14, with the handle bolts 26 threaded into holes 162 of the end plates 134 (FIG. 21A) at each end of the clamping bars 22 and 24. When so bolted, the holes 69 of the belt clampiing bars 22 and 24 are aligned with the holes 71 of the clamp base 160 so that a nail 68 may be driven through the belt ends and the holes to further secure the belt ends.

The anvil plates 18 are generally rectangular in shape, as shown in FIG. 3, and have a plurality of anvil upsetting portions or buttons 20 spaced to correspond with the holes 122 of the underlying channel base 120. Each anvil plate has four holes 164 through which (together with the holes 124 of the underlying channel base 120) bolt and nut assemblies 126 (FIG. 1) are inserted to bolt the anvil plates 18 to the channel base 120 of the anvil base 12. A cross section along the line 5—5 of a button 20 is shown in FIG. 5. The button has a hole 166 through which the nail portion 108 of the rivet-nails 96 may pass as the nail-rivets are being driven. The button 20 further has the stop surface 114 in which the projection 168 of the nail 108 is seated which stops further progress of the nail 108 into the button 20. The anvil surfaces 116 of the button 20 further deflect the rivet ends 110 of the rivets 98 after the rivet ends have been initially flared by the surfaces 112 of the nail 108. The anvil base 12 further has a handle 180 bolted to each end of the channel base 120 by which the apparatus 10 may be held to stabilize the apparatus while the rivet-nails are being driven.

The T-rail 14 shown in FIGS. 11A-C is generally T-shaped and has a central upright member 170 and a cross-member 172 (best seen in FIG. 11C). Longitudinally disposed on the bottom side of the cross-member 172 are the plurality of projections 74 having an outer locating surface 76 and an inner bore 80. The projections 74 are spaced to correspond with the enlarged portions 78 of the slots 48 between the upper plate fasteners. The locating surfaces of the projections 74 engage the slots 48 to hold and clamp the upper plate fasteners when the T-rail 14 is bolted to the anvil base 12. At each end of the T-rail 14 is a hole 174 through which the ends of the T-rail are bolted by the bolts 92 to the end plates 134 and the channel base 120.

The strip clips 84, which hold the plastic strip or ribbon 86 in place over the edges of the belt ends when the T-rail and the upper plate fasteners are clamped into place, have a generally flat, rectangular body 180 which has the hook-shaped projections 85 at each end, as shown in FIGS. 12A and 12C. The plastic ribbon is squeezed between the projections 85 and is held between them and the body 180. Carried on the side of the body 180 opposite from the projections 85 is a centrally located and generally cylindrical projection 82, shown in FIGS. 12A and 12B, which is received by a bore 80 of the T-rail 14. Disposed diametrically opposite from the projection 82 are the generally rectangular projections 88 which engage the slots 48 of the upper plate fasteners 38 when the projection 82 of the strip clips 84 are inserted through the slots 48 and into the bores 80 of the T-rail 14.

When fully assembled, it is seen (as shown in FIGS. 13-15) that the lower plate fasteners 36 are securely held by the T-clips 52 which are clamped to the anvil base 12 by the cam lock rod 60. Furthermore, the upper plate fasteners are firmly clamped to the anvil base by the T-rail 14 and locator plate 15. The rivet-nails can be driven to fasten the belt ends 32 and 90 between the fastener plates 36 and 38 without the fastener plates shifting. The plastic ribbon 86 is held by the strip clips 82 which are in turn held by the T-rail 14 and upper plate fasteners 38. The belt ends 32 and 90 are further clamped by the clamping bars 22 and 24.

Thus, the lower plate fasteners 36 and upper plate fasteners 38 are securely held and prevented from shifting and becoming misaligned while the nail rivets 96 are being driven. Furthermore, the strip clips 84 hold the strip 86 in place over the edges of the belt ends while the nail rivets are being driven. The strip clips 84 also clamp the upper plate fasteners to the T-rail 14 so that the upper plate fasteners are securely held when the T-rail 14 is inverted from the assembly position in which the upper plate fasteners are on top of the T-rail 14 to their rivet-receiving position in which the T-rail is on top of the upper plate fasteners.

The strength of the T-clips 52 is particularly important to resist the large forces generated and trying to displace the lower plate fasteners during the riveting operation. While the cross bar portion of the T-clips remain between the belt and fasteners after breaking off the bodies, these cross bar portions should either work their way out or they will remain and do no damage to the belt. The plate fasteners need not be any convenient length of two or more plate fasteners.

While the illustrated plate fasteners have slots 48 between adjacent fasteners to receive the locking T-clips 52 and portions 74 of the T-rail 14, it will be appreciated that various other locations on the belt fastener, per se, may be used. For instance, slots 48 may be made in the body of the plate fasteners rather than between the bodies, as illustrated herein. Manifestly, the means for securing the upper plate fasteners may have other shapes than the described T-rail 14. Likewise, other means having different shapes than the T-clips 52 and strip clips 84 may be used with the upper and lower plate fasteners and still fall within the purview of the appended claims.

It will, of course, be understood that modifications of the present invention in its various aspects will be apparent to those skilled in the art, some being apparent only after study, and others being merely matters of routine mechanical design. As such, the scope of the invention should not be limited to the particular embodiment and specific instruction herein described, but should be defined only by the appended claims, and equivalents thereof.

Various features of the invention are set forth in the following claims:

What is claimed is:

1. An apparatus for fastening two belt ends of a conveyor belt together utilizing upper and lower plate portions disposed above and below the belt ends and having rivet holes, and nail-rivet fasteners driven through the upper plate portions, the belt ends and the lower plate portions, said apparatus comprising:

an anvil means underlying the lower plate portions, for upsetting rivet ends of the nail-rivet fasteners driven through the upper and lower plate portions and the belt;

means associated with the anvil means and the lower plate portions for clamping the lower plate portions in an aligned relationship with the anvil means so that the lower plate portion rivet holes are securely aligned with the anvil upsetting means;

means for securing the belt ends of the belt over the lower plate portions; and means associated with said anvil means and the upper plate portions for clamping the upper plate portion in an aligned relationship so that the rivet holes of the upper plate portions are securely aligned with the rivet holes of the lower plate portion and the anvil upsetting means whereby the upper and lower plates, the belt and the anvil means are prevented from becoming misaligned while the nail-rivet fasteners are being driven.

2. The apparatus of claim 1 in which said lower plate portions have apertures therein and in which the lower plate portion clamping means comprises means engaging the upper side of said lower plate portions and inserted through said apertures therein for connection to said anvil means.

3. The apparatus of claim 2 in which the means engaging the upper side of the lower plate portions extending through apertures therein comprises a frangible bottom portion which may be broken off from the portion disposed between the lower plate portions and a belt end.

4. The apparatus of claim 3 in which said anvil means has apertures therein aligned with the apertures in said lower plates and said frangible bottom portion extends through one of said apertures in said anvil means and a locking means locks said frangible portion to said anvil means.

5. The apparatus of claim 1 wherein the lower plate portion clamping means comprises clip means for hooking the lower plate portions and locking means for locking the clip means to the anvil means.

6. The apparatus of claim 5 wherein the clip means comprises a T-shaped clip having a cross member and a central member, the lower plate portions having a first slot and the anvil means having a second slot such that the cross member may be disposed on a lower plate portion with the central member extending through the first and second slots to engage the locking means and to align a lower plate portion with the anvil means in said aligned relationship.

7. The apparatus of claim 6 wherein the locking means comprises a rod and the central member has an aperture through which the rod may be fed.

8. The apparatus of claim 6 wherein at least two of the lower plate portions have a plurality of bridging members connecting therebetween, said bridging members and the two lower plate portions defining the first slot between the two lower plate portions.

9. The apparatus of claim 7 wherein the central member has a wall defining an elongated aperture, which provides a camming surface whereby the rod may be rotated to engage the camming surface of the wall of the aperture to lock the rod within the aperture.

10. The apparatus of claim 1 further comprising a bar means for clamping a belt end to the anvil means in the aligned relationship with the upper and lower plate portions.

11. The apparatus of claim 10 further comprising a second bar means for providing an aligning edge with which the belt end may be aligned before being clamped by the first bar means.

12. The apparatus of claim 11 wherein the second bar means also has means for clamping the other belt end in the aligned relationship with the first belt end and the upper and lower plate portions after the first belt end has been clamped.

13. The apparatus of claim 10 further comprising piercing means for piercing the belt end to further secure the belt end to the anvil means in the aligned relationship.

14. The apparatus of claim 1 wherein the upper plate portion clamping means has cooperating locating surfaces associated therewith located longitudinally along said upper plate portions for engaging and holding the upper plate portions against shifting during the fastening of the upper and lower plate portions to the belt ends.

15. The apparatus of claim 14 wherein said locating surfaces comprise projections disposed downwardly from the clamping means and the upper plate fasteners have apertures for receiving the projections to secure the upper plate portions in the aligned position.

16. The apparatus of claim 14 further comprising means for locating a strip between said upper plate portions and said belt ends, said strip being disposed on the belt ends for preventing material from sifting out between the belt ends.

17. The apparatus of claim 16 in which said means for locating the strip comprises a plurality of clip means on said upper plate portion claamping means for securing the strip in an aligned position between the belt ends and the upper plate portions.

18. The apparatus of claim 17 in which said upper plate portion clamping means comprises a bar means positioned longitudinally over said upper plate portions, and in which the clip means have projections to align the clip means and the strip with respect to the belt ends and the upper plate portions; the bar means having means for receiving the clip means projections to secure the clip means and strip in the aligned relationship.

19. The apparatus of claim 18 wherein said means for receiving the clip means projections comprises a plurality of bores each for receiving a clip means projection to secure the clip means and the strip in the aligned relationship.

20. The apparatus of claim 19 wherein the clip means projections are constructed of a frangible material so that any portion of the clip means projections extending past the upper plate fasteners may be broken off after the belt-rivet fasteners have been driven and the bar means removed.

21. An apparatus for fastening two belt ends of a conveyor belt together utilizing upper and lower plate fasteners disposed above and below the belt ends and having rivet holes and nail-rivet fasteners driven through the upper plate fasteners, the belt ends and the lower plate fasteners, said apparatus comprising:
   an anvil means underlying the lower plate fasteners, for upsetting rivet ends of the nail-rivet fasteners driven through the upper and lower plate fasteners and the belt;
   clip means for hooking the lower plate fasteners;
   locking means for locking the clip means to the anvil means to securely align the rivet holes of the lower plate fasteners with the anvil upsetting means;
   clamping means for clamping the belt ends to the anvil means over the lower plate fasteners;
   bar means positioned longitudinally over the upper plate fasteners and having projections disposed downwardly for engaging the upper plate fasteners, said upper plate fasteners having apertures for receiving the projections, said bar means for holding the upper plate portions in an aligned relationship so that the rivet holes of the upper plate portion are securely aligned with the rivet holes of the lower plate portion and the anvil upsetting means; and
   a second plurality of clip means for locating a strip between said upper plate fasteners and said belt ends, said strip being disposed on the belt ends for preventing material from sifting out between the belt ends.

22. In an apparatus for fastening ends of a belt together with upper plate fasteners over the top of the belt ends and lower plate fasteners beneath the belt ends by rivets driven through openings in the upper plates and through the belt into aligned openings in the lower plate portions which cooperate with an underlying anvil means for upsetting the rivet ends of nail-rivet fasteners, said upper and lower plate fasteners being discrete, the improvement comprising/means for holding the upper plate fasteners in aligned position with the underlying anvil means, and means for engaging and holding the lower plate fasteners in the aligned relationship with the anvil means and the upper plate fasteners during the driving and upsetting of the rivets.

23. The apparatus of claim 22 in which said lower plate fasteners have apertures therein and in which the holding and engaging means comprises means engaging the upper side of said lower plate fasteners and inserted through said apertures therein for connection to said anvil means.

24. The apparatus of claim 23 in which the means engaging the upper side of the fasteners and extending through apertures therein comprises a frangible bottom portion which may be broken off from the portion engaging the lower plate fasteners.

25. The apparatus of claim 24 in which said anvil means has apertures therein aligned with the apertures in said lower plates and said frangible bottom portion extends through one of said apertures in said anvil means and a locking means locks said frangible portion to said anvil means.

26. The apparatus of claim 22 wherein said engaging and holding means comprises a clip means for hooking the lower plate portions and locking means for locking the clip means to the anvil means.

27. The apparatus of claim 26 wherein the clip means comprises a T-shaped clip having a cross member and a central member, the lower plate portions having a first slot and the anvil means having a second slot such that the cross member may be disposed on a lower plate portion with the central member extending through the first and second slots to engage the locking means and to align a lower plate portion with the anvil means in said aligned relationship.

28. The apparatus of claim 27 wherein the locking means comprises a rod and the central member has an aperture through which the rod may be fed.

29. The apparatus of claim 27 wherein at least two of the lower plate portions have a plurality of bridging members connecting therebetween, said bridging members and the two lower plate portions defining the first slot between the two lower plate portions.

30. The apparatus of claim 28 wherein the central member has a wall defining an elongated aperture and the rod has a camming surface whereby the rod may be rotated to engage the camming surface with the wall of the aperture to lock the rod within the aperture.

31. The apparatus of claim 22 further comprising a bar means for clamping a belt end to the anvil means in the aligned relationship with the upper and lower plate portions.

32. The apparatus of claim 31 further comprising a second bar means for providing an aligning edge with which the belt end may be aligned before being clamped by the first bar means.

33. The apparatus of claim 32 wherein the second bar means also has means for clamping the other belt end in the aligned relationship with the first belt end and the upper and lower plate portions after the first belt end has been clamped.

34. The apparatus of claim 31 further comprising piercing means for piercing the belt end to further secure the belt end to the anvil means in the aligned relationship.

35. In an apparatus for holding, in an aligned relationship an upper row of upper plate fasteners relative to lower row of lower plate fasteners and to belt ends disposed between the upper and lower plate fasteners and in aligned relationship to an anvil means underlying the lower plate fasteners for upsetting the rivet ends of rivets driven through the upper plate fasteners, the belt ends and the lower plate fasteners into the anvil means, the improvement comprising clamping means associated with the anvil means and the upper plate fasteners to clamp the upper plate fasteners in the aligned relationship against the belt ends; and cooperating locating surfaces associated with said clamping means and located longitudinally along said row of upper plate fasteners for engaging and holding the upper plate fasteners against shifting during the fastening of the upper plate and lower plate fasteners to the belt ends.

36. The apparatus of claim 35 wherein said locating surfaces comprise projections disposed downwardly from the clamping means and the upper plate fasteners have apertures for receiving the projections to secure the upper plate fasteners in the aligned position.

37. The apparatus of claim 35 further comprising means for locating a strip between said upper plate fasteners and said belt ends, said strip being disposed on the belt ends for preventing material from sifting out between the belt ends.

38. The apparatus of claim 37 in which said means for locating the strip comprises a plurality of clip means on said clamping means for securing the strip in an aligned position between the belt ends and the upper plate portions.

39. The apparatus of claim 38 in which said clamping means comprises a bar means positioned longitudinally over said row of plate fasteners, and in which clip means have projections to align the clip means and the strip with respect to the belt ends and the upper plate portions; the bar means having means for receiving the clip means projections to secure the clip means and strip in the aligned relationship.

40. Th apparatus of claim 39 wherein said means for receiving the clip means projections comprises a plurality of bores each for receiving a clip means projection to secure the clip means and the strip in the aligned relationship.

41. The apparatus of claim 39 wherein the clip means projections are constructed of a frangible material so that any portion of the clip means projections extending past the upper plate fasteners may be broken off after the belt-rivet fasteners have been driven and the bar means removed.

* * * * *